United States Patent [19]

Otake

[11] Patent Number: 4,816,196
[45] Date of Patent: Mar. 28, 1989

[54] METHOD AND APPARATUS FOR EFFECTING INJECTION CONTROL OF AN INJECTION-MOLDING MACHINE

[75] Inventor: Hiromasa Otake, Tanashi, Japan

[73] Assignee: Fanuc Ltd, Minamitsuru, Japan

[21] Appl. No.: 86,143

[22] PCT Filed: Nov. 29, 1986

[86] PCT No.: PCT/JP86/00611
§ 371 Date: Jul. 24, 1987
§ 102(e) Date: Jul. 24, 1987

[87] PCT Pub. No.: WO87/03247
PCT Pub. Date: Jun. 4, 1987

[30] Foreign Application Priority Data

Nov. 29, 1985 [JP] Japan .................................. 60-267512

[51] Int. Cl.[4] .............................................. B29C 45/77
[52] U.S. Cl. ..................... 264/40.1; 264/40.7;
318/632; 364/476; 425/135; 425/149; 425/166
[58] Field of Search ........... 264/40.1, 40.3, 40.5,
264/40.7; 425/135, 145, 146, 149, 150, 155, 156,
159, 166, 167; 318/567, 572, 632; 364/476

[56] References Cited

U.S. PATENT DOCUMENTS

| 3,932,083 | 1/1976 | Boethner | 425/145 |
| 4,146,601 | 3/1979 | Bishop | 425/149 |
| 4,161,380 | 7/1979 | Bishop | 425/149 |
| 4,325,896 | 4/1982 | Rodgers, Jr. | 425/149 |
| 4,411,609 | 10/1983 | Yoshii et al. | 425/149 |

FOREIGN PATENT DOCUMENTS

| 48-113083 | 10/1974 | Japan . | |
| 56-99643 | 8/1981 | Japan | 425/156 |

Primary Examiner—Jan H. Silbaugh
Assistant Examiner—Jill L. Heitbrink
Attorney, Agent, or Firm—Staas & Halsey

[57] ABSTRACT

A method and an apparatus for injection control for an injection-molding machine, adapted to perform injection control by means of a servomotor controlled by a numerical control unit, in which the injection control is completed by performing pulse distribution to the servomotor, up to a hold pressure end position, and a follow-up operation when injection-speed control and hold pressure control for individually predetermined times are finished, in order that the injection-speed control and the hold pressure control can be executed in a time-based manner.

8 Claims, 3 Drawing Sheets

METHOD AND APPARATUS FOR EFFECTING INJECTION CONTROL OF AN INJECTION-MOLDING MACHINE

BACKGROUND OF THE INVENTION

1. Field of the Invention

The present invention relates to an injection-molding machine, and more particularly, to a method and an apparatus for controlling injection of an injection-molding machine, in which the injection of the injection-molding machine is controlled by means of a numerical control unit.

2. Description of the Related Art

Injection control in an injection-molding machine may be effected by two control methods, as shown in FIGS. 4 and 5. Namely, in a system of the type shown in FIG. 4, speed control is performed from an injection starr position, and, when a screw reaches a switching position for hold, the speed control is changed over to hold pressure control. Thereupon, hold is performed for a predetermined period of time, and a metering block in the next stage is entered. According to the system of FIG. 5, injection control is performed for a predetermined time after the start of injection, and, when the predetermined time for the injection control elapses, the injection control is changed over to the hold pressure control. When the hold time terminates, the metering block in the next stage is entered.

Conventionally, in controlling an injection-molding machine by means of a numerical control unit (hereinafter referred to as NC unit), the system of FIG. 4, not the system of FIG. 5, has been used. However, if the screw cannot inject resin at a predetermined injection speed and cannot, therefore, reach the switching position for hold within a normal required injection time, on account of the viscosity of the resin being too high or any other reason, the time required for the execution of an injection cycle is extended, thus lowering the efficiency of production. Also, the screw cannot follow up an output command, for use as a speed command, so that an error of a command for movement, compared with an actual screw position, is stored in an error register in the NC unit. If the value of the error reaches a predetermined level or higher, the NC unit stops pulse distribution, thereby possibly stopping the whole injection-molding machine in an unexpected manner.

SUMMARY OF THE INVENTION

It is an object of the present invention to provide a method of injection control for an injection-molding machine by means of an NC unit, whereby the aforementioned drawbacks of the prior art are eliminated, and injection control can be performed on the basis of the time elapsed after the start of injection.

In order to achieve the above object, according to the present invention, injection is performed while controlling the injection speed by means of injection-speed control means when an injection command is inputted. At the same time, a first timer for measuring a predetermined time after the start of the injection is started. When the preset time of the first timer is up, hold pressure control is performed by hold pressure control means, and a second timer for measuring a predetermined time after the start of the hold pressure control is started. When the preset time of the second timer is up, pulse distribution is performed until the position of a screw reaches a hold pressure end position, and a follow-up operation is performed by follow-up means so that a value stored in an error register through the pulse distribution becomes zero.

Thus, according to the present invention, injection control can be controlled in a time-based manner, even in an injection-molding machine which is controlled by an NC unit. Accordingly, the injection cycle is fixed. Even if a servomotor, for use as a drive source for the injection, cannot inject resin at a predetermined speed so that the screw cannot reach a switching position for hold, for any reasons, the control mode is switched to hold pressure control and the second timer is actuated when the preset time of the first timer is up. When the preset time of the second timer is up, pulse distribution is performed compulsorily so that the screw apparently reaches the hold pressure end position, and the follow-up operation is accomplished. Accordingly, the pulse distribution for a block for the movement command, out of commands for injection and hold, is completed, so that the NC unit can proceed to a metering cycle in the next stage. Thus, the NC unit can be operated efficiently, without stopping the whole injection-molding machine.

DESCRIPTION OF THE PREFERRED EMBODIMENT

Figure 1:
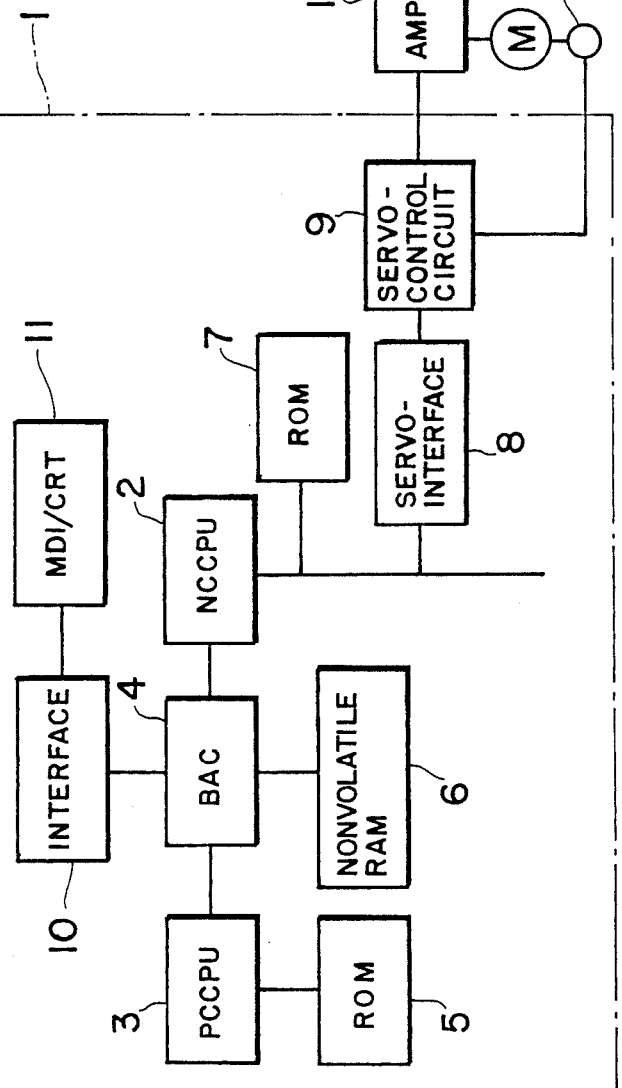
FIG. 1 is a block diagram showing the principal part of an embodiment of the present invention.
Figure 4:
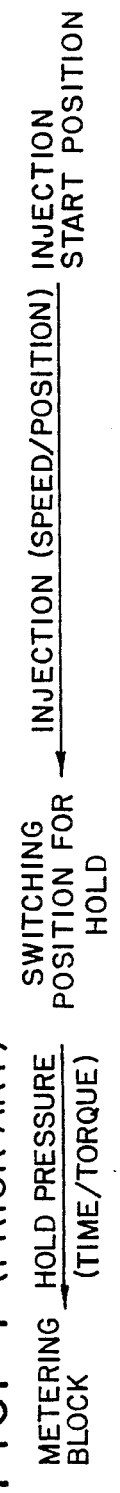
FIGS. 4 and 5 are diagrams for illustrating injection control.
Figure 5:
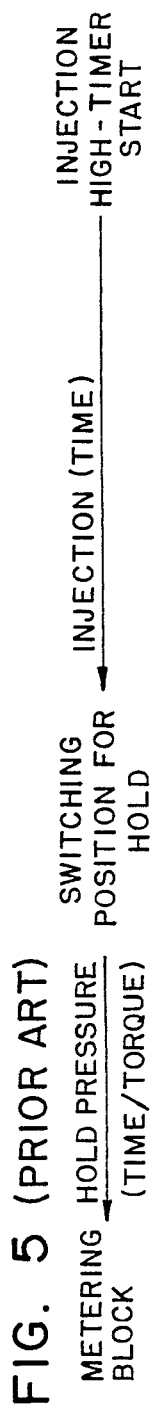

FIG. 1 is a block diagram showing the principal part of an embodiment of the present invention, in which numeral 1 denotes an NC unit, and symbol M designates a servomotor which drives, for injection, an injection axis or screw of an injection-molding machine in the axial direction. The servomotor M is provided with a position detector P for detecting the position, speed, etc., of the screw. The NC unit 1 includes a microprocessor (hereinafter referred to as NCCPU) 2 for numerical control, and a programmable controller CPU (hereinafter referred to as PCCPU) 3. The PCCPU 3 is connected with a ROM 5 which stores a sequence program for the injection-molding machine. The NCCPU 2 is connected with a ROM 7, which stores a control program for generally controlling the injection-molding machine, and with a servo-control circuit 9 for controlling the drive of the servomotor M, through a servo-interface 8. The output of the servo-control circuit 9 is amplified by means an amplifier 12, and is used to drive the servomotor M.

In FIG. 1, although the servo-control circuit 9 and the servomotor M for the injection axis are only shown, the servo-interface 8 is also connected with servo-control circuits for servomotors which are associated with a clamp axis, used to drive a die-clamping mechanism, and associated with a metering axis for rotating the screw. FIG. 1 shows the servo-control circuit 9 and the servomotor M for the injection shaft only.

Numeral 6 denotes a nonvolatile RAM which, including a backup power source, stores programs for controlling individual operations of the injection-molding machine, various set values, parameters, etc. Numeral 11 denotes a manual-data input device with a CRT display (hereinafter referred to as MDI/CRT), which is connected to a bus-arbiter controller (hereinafter referred to as BAC) 4 through an interface 10. The BAC 4 is connected with the respective buses of the NCCPU 2, the PCCPU 3, and the nonvolatile RAM 6. The bus to be used is selected by the BAC 4.

Referring now to the operational flow charts of FIGS. 2 and 3, the operations of the present embodiment, arranged in the aforesaid manner, will be described.

First, the MDI/CRT 11 sets various conditions for an injection cycle, such as the injection speed for each injection step, the injection-speed changing position, the position for a changeover from injection-speed control to hold pressure control, the injection time, the hold time, the torque-limit value used to control the pressure for hold, the rapid-feed rate value used in compulsory pulse distribution, as mentioned later, etc. These conditions are stored into the nonvolatile RAM 6.

At the start of operation, the NCCPU 2 reads out, through the BAC 4, an injection-speed control program stored in the nonvolatile RAM 6. Based on this program, the NCCPU 2 performs pulse distribution according to the injection speed for each injection step, in order to accopplish injection-speed control. At the start of a first step of injection, the NCCPU 2 delivers a pulse-distribution start signal and an M1 code to the PCCPU 3 through the BAC 4, and stores them into the nonvolatile RAM 6. The M1 code is indicative of an injection-speed control block being executed. When the PCCPU 3 reads and detects the pulse-distribution start signal from the nonvolatile RAM 6, it starts an injection high-timer T1, which is used to measure an injection-speed control time, and starts an injection sequence upon detection of the M1 code (Step S1). Then, the PCCPU 3 repeatedly determines whether or not the preset time of the injection high-timer T1 is up (Step S2), and whether or not a signal indicative of a completion of pulse distribution up to a switching point for hold is delivered from the NCCPU 2 (Step S3).

If the NCCPU 2 finishes the pulse distribution up to the switching point for hold before the preset time of the injection high-timer T1 is up, and when the nonvolatile RAM 6 is stored with a pulse-distribution end signal, the PCCPU 3 reads this signal from the nonvolatile RAM 6 through the BAC 4. Thereupon, the PCCPU 3 delivers an M1-code end signal FIN, indicative of a completion of the injection-speed control block, and stores the signal FIN into the nonvolatile RAM 6 (Step S4). On reading the M1-code end signal from the nonvolatile RAM 6, the NCCPU 2 reads out a control program for a hold pressure control block stored in the nonvolatile RAM 6. Then, the NCCPU 2 starts hold pressure control in accordance with this program, and stores the nonvolatile RAM 6 with an M2 code, which is indicative of an entry into the hold pressure control. Thereupon, the PCCPU 3 identifies the M2 code, starts a hold pressure timer T2, and delivers a torque-limit value corresponding to a set hold pressure stored in the nonvolatile RAM 6.

At the same time, the PCCPU 3 causes the NCCPU 2 to drive the servomotor M so that the output torque of the motor M is restricted to a value corresponding to the torque-limit value, thus performing hold pressure control in a manner such that the set hold pressure is applied to resin (Step S5). During the hold pressure control, the NCCPU 2 executes pulse distribution for hold pressure control. On completion of the pulse distribution, the NCCPU 2 delivers a second pulse-distribution end signal. Then, the PCCPU 3 determines whether or not the preset time of the hold pressure timer T2 is up (Step S6). If it concludes that the preset time is up, the PCCPU 3 further determines whether or not the nonvolatile RAM 6 is stored with the pulse-distribution end signal for hold from the NCCPU 2 (Step S7). If it detects a delivery of the second pulse-distribution end signal from the NCCPU 2, the PCCPU 3 delivers an M2-code end signal FIN to the NCCPU2 through the nonvolatile RAM 6, concluding that the hold pressure control block is finished (Step S8). On receiving the M2-code end signal, the NCCPU 2 starts a metering cycle as a block next to the hold block.

On the other hand, in Step 2 if the injection high-timer T1 is up before the pulse-distribution end signal (indicative of a completion of the pulse distribution up to the switching position for hold pressure control in the injection-speed control block) is delivered from the NCCPU 2, the PCCPU 3 starts a sequence of hld operations. While limiting the torque of the servomotor M on the basis of the torque-limit value corresponding to the hold pressure set in the nonvolatile RAM 6, the PCCPU 3 drives the motor and starts the hold pressure timer T2 (Step S9). Thus, if the screw fails to reach the switching position for hold within a normal required injection time set by the injection high-timer T1, for any reason, the operation mode is changed compulsorily over to the hold pressure control when the set time is up.

Subsequently, the PCCPU 3 determines whether or not the pulse-distribution end signal, indicative of completion of the pulse distribution up to the switching position for hold, has been delivered from the NCCPU 2 (Step S10), and whether or not the preset time of the hold pressure timer T2 is up (Step S11). If the preset time of the hold pressure timer T2 is up before the signal indicative of the completion of the pulse distribution up to the switching position for hold has been detected, that is, if the preset time of the hold pressure timer T2 is up before the screw reaches the switching position for hold, the PCCPU 3 starts a follow-up function of the numerical control unit 1, and at the same time, turns on a dry-run function of the unit 1, and starts or turns on a rapid-feed-rate output operation (Step S12). More specifically, the NCCPU 2 reads out a value in an error register which stores therein the difference between a speed command value in the servo-control circuit 9 and a signal from the position detector P attached to the servomotor M. Then, the NCCPU 2 delivers a pulse output such that the read value becomes zero, thereby performing follow-up operation. Since a dry-run-on signal is on, the remaining distribution pulses are delivered from the NCCPU 2 to the error register at a speed set by the rapid-feed rate.

Thus, although the screw position has not reached the switching point for hold yet, the pulse distribution is performed compulsorily (because the NC unit cannot proceed to the next block without finishing the pulse distribution for the block concerned). In this manner, although the screw position is not shifted to the switching position for hold, the pulse distribution up to the switching position for hold is accomplished compulsorily, and the follow-up operation is achieved so that the value in the error register becomes zero, that is, as if the screw had reached the switching position for hold. In consequence, the value in the error register cannot exceed a predetermined value, and the injection-molding machine cannot be stopped wholly. If the PCCPU 3 detects a delivery of a follow-up end signal for the M1 block (injection-speed control block) from the NCCPU 2 (Step S13), it delivers the M1-code end signal (Step S14).

At the time of delivery of the M1-code end signal, the NCCPU 2 further starts to execute the M2 block (hold pressure control block), and the follow-up operation is also performed during the execution of this block, in the manner as aforesaid. Thereafter, a follow-up end signal for the M2 block from the NCCPU 2 is applied to the PCCPU 3 (Step S15), whereupon the PCCPU 3 turns off the follow-up function, dry-run function, and rapid-feed-rate output operation of the numerical control unit 1 (Step S16), and delivers an M2-block (pressure-control-block) end signal FIN to the NCCPU 2 (Step S17). On reception of this end signal FIN, the NCCPU 2 proceeds to the metering cycle in the next stage.

If the end signal indicative of a completion of the pulse distribution up to the switching position for hold is applied from the NCCPU 2 to the PCCPU 3, in Step S10, before the preset time of the hold pressure timer T2, which has started after the changeover to the hold pressure control, is up, the PCCPU 3 delivers the M1-code end signal to the NCCPU 2 (Step S18), while the NCCPU 2 starts to control the hold block, and also delivers the M2 code, indicative of the execution of the hold pressure control, to the PCCPU 3. On identifying this M2 code, on the other hand, the PCCPU 3 starts to control a hold operation sequence, and reads and delivers the torque-limit value which, corresponding to the set hold pressure, is stored in the nonvolatile RAM 6. Thus, the PCCPU 3 drives the servomotor M, for hold pressure control, so that the output torque of the motor is restricted to the delivered torque-limit value (Step S19). Then, the PCCPU 3 determines whether or not the preset time of the timer T2 is up (Step S20). If it concludes that the preset time of the timer T2 is up, the PCCPU 3 further determines whether or not the pulse distribution end signal, in the hold block, is being delivered from the NCCPU 2 (Step S21). If it detects the delivery of the signal, the CPU 3 delivers the M2-code (hold-pressure-control) end signal FIN, and proceeds to the metering cycle in the next stage.

If it is concluded, in Step S21, that the pulse-distribution end signal is not detected, though the preset time of the hold pressure timer T2 is up, that is, if the pulse distribution in the hold is not finished, the follow-up function, dry-run function, and rapid-feed-rate output operation are turned on, just as in Step S12. Thus, the pulse distribution is executed compulsorily, and the follow-up operation is performed to reduce the value in the error register to zero (Step S23). Thereafter, processes of Steps S15 to S17 are executed.

If it is concluded in Step S7, moreover, that the pulse distribution for hold pressure is not completed even after the preset time of the hold pressure timer T2 is terminated during the hold pressure control in the hold pressure block, after the end of the injection-speed control, the process of Step S23 and other processes following the same are executed. Thus, the hold pressure control is completed compulsorily, and the metering cycle is entered in the next stage.

In the embodiment described above, the changeovers from the injection-speed control to the hold pressure control and from the hold pressure control to the metering cycle are based on the screw position or time. Alternatively, however, the changeover to the hold or the metering cycle may be effected on the basis of the time only, without using the method of changeover to the hold or metering by detecting the screw position.

Figure 2:
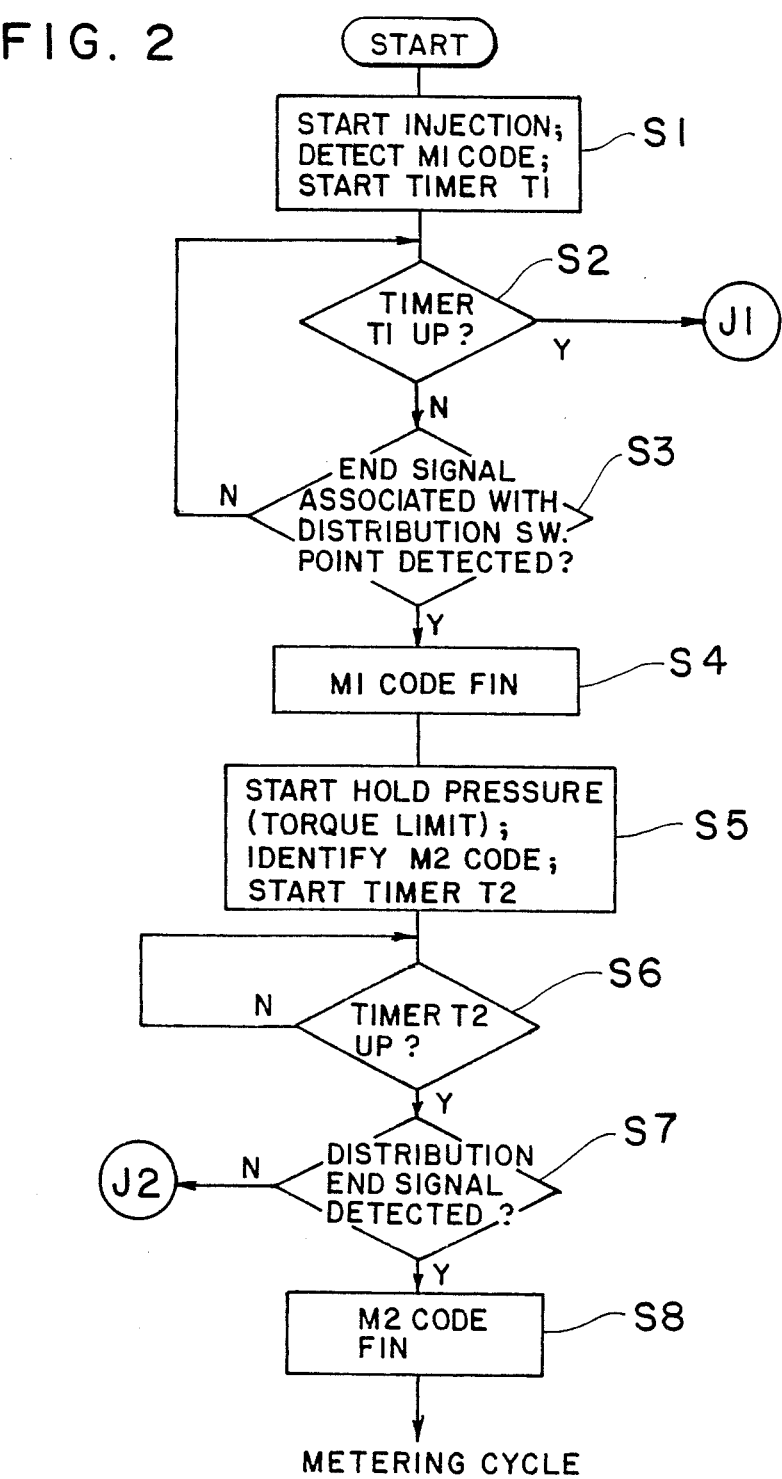
FIGS. 2 and 3 are operational flow charts illustrating the embodiment of FIG. 1.
Figure 3:
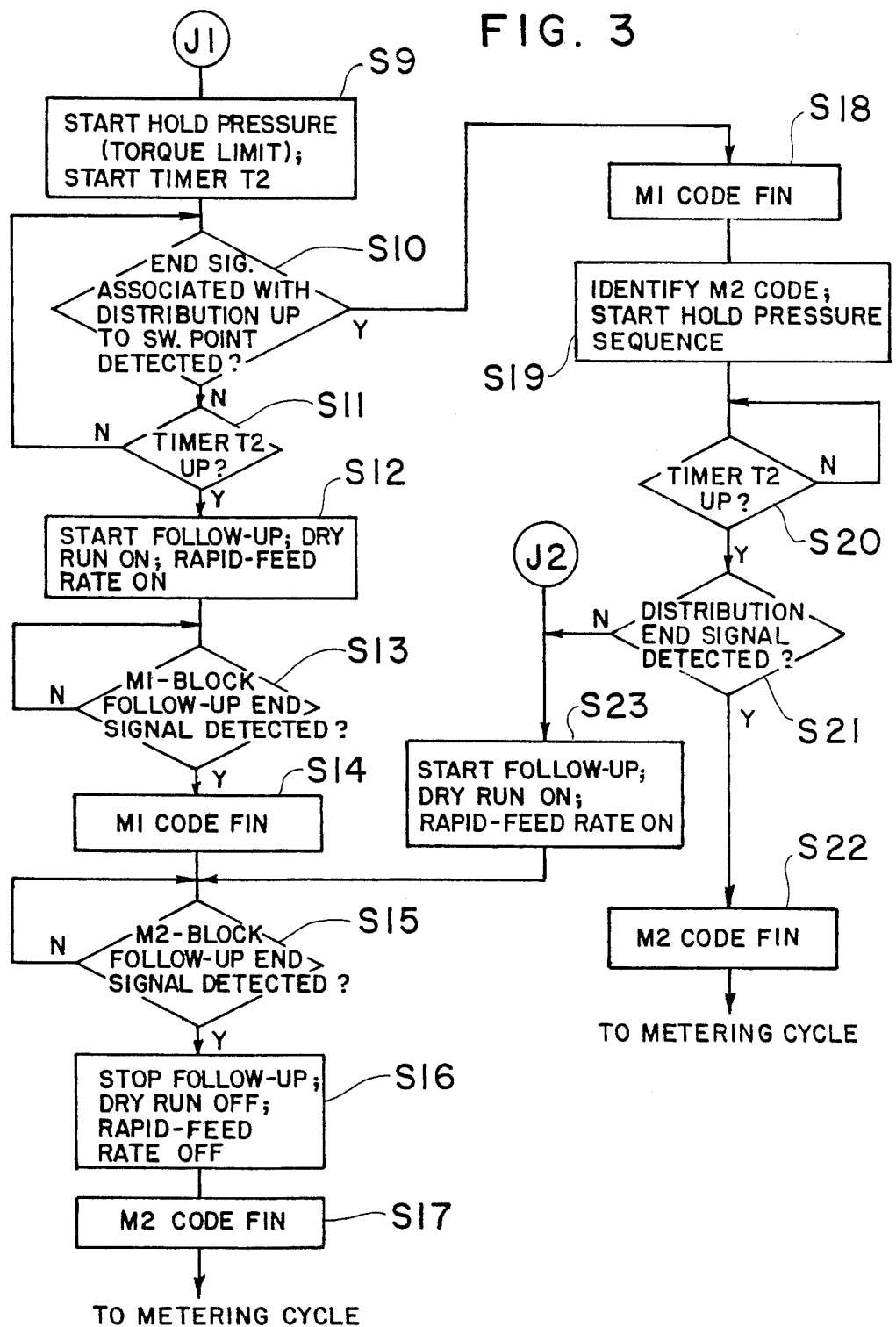

In this case, the processes of Steps S3 to S8, S10, and S18 to S23, shown in the operational flow charts of FIGS. 2 and 3, are unnecessary, and Step S1 is followed by Step S2. In Step S2, the end of the preset time of the timer T1 is awaited, and Step S9 is entered thereafter. Step S9 is followed by Step S11, in which termination of the preset time of the hold pressure timer T2 is awaited. When the preset time of the hold pressure timer T2 is up, the processes of Step S12 to S17 are executed.

I claim:

1. In a method of injection control for an injection-molding machine having a numerical control means and a servomotor, the numerical control means being operable in accordance with a numerical control program including an injection speed control block, a hold pressure control block and a metering block in the mentioned order and being arranged to be permitted to enter the hold pressure control block and the metering block after first and second pulse distributions have been completed, respectively, the first and second pulse distributions being associated with the injection speed control block and the hold pressure control block and corresponding to first and second commands for causing an injection screw to move up to an injection/hold switching position and to move from the injection/hold switching position to a hold end position, respectively, the servomotor being driven by the numerical control means through a servo circuit having an error register for storing therein an error during each of the first and second commands and an actual moved amount of the screw, so that the screw is axially moved at a predetermined injection speed and then receives a predetermined hold pressure, and thereafter metering is performed, the improvement comprising the steps of:

(a) performing a first changeover from injection speed control associated with the injection speed control block to hold pressure control associated with the hold pressure control block when a first predetermined time period, determined on the basis of a normally required injection time period, has elapsed from the start of the injection speed control;

(b) performing a second changeover from the hold pressure control to metering control associated with the metering block after the hold pressure control has been executed for a second predetermined time period;

(c) forcibly executing the first pulse distribution when the first pulse distribution has not been completed after the first predetermined time period has elapsed, and performing a first follow-up operation such that a first error stored in the error register is reduced to a first predetermined value, and the initiating a dummy hold pressure control; and (d) forcibly executing the second pulse distribution when the second pulse distribution has not been completed after at least one of the hold pressure control and the dummy hold pressure control has been executed for the second predetermined time period, and performing a second follow-up operation such that a second error stored in the error register is reduced to a second predetermined value, the first and second changeovers being performed smoothly to avoid an excessive increase in injection-molding cycle time and unexpected stoppage of the injection-molding machine.

2. An injection control method for an injection molding machine according to claim 1 wherein the first changeover in said step (a) is immediately performed when the injection screw reaches the injection/hold switching position, during the injection-speed control, before said first predetermined time period terminates.

3. An injection control method for an injection-molding machine according to claim 2, wherein the hold pressure control is continued until said second predetermined time period has elapsed even when the screw reaches the hold end position, during the hold pressure control, before said second predetermined time period terminates.

4. An injection control method for an injection-molding machine according to claims 1, 2 or 3, wherein the forcibly executed first and second pulse distributions and the follow-up operations are performed at high speeds, respectively, in said steps (c) and (d).

5. An injection control apparatus for an injection-molding machine having an injection screw, comprising:
   numerical control means operable in accordance with a numerical control program including an injection speed control block, a hold pressure control block and a metering block in the mentioned order, said numerical control means having pulse distribution means for executing first and second pulse distributions associated with the injection speed control block and the hold pressure control block and corresponding to first and second commands for causing the injection screw to move to an injection/hold switching position and to move from the injection/hold switching position to a hold end position, respectively, said numerical control means permitted to enter the hold pressure control block and the metering block after the first and second pulse distributions have been completed, respectively;
   servomotor means for axially driving the screw;
   servo circuit means for driving said servomotor means, said servo circuit means having an error register for storing therein an error during each of the first and second commands and an actual moved amount of the screw;
   first timer means for detecting the passage of a first predetermined time period after the start of injection speed control associated with the injection speed control block, the first predetermined time period being determined on the basis of a normally required injection time period; and
   second timer means for detecting the passage of a second predetermined time period after the start of hold pressure control associated with the hold pressure control block;
   said numerical control means further including
   control means for controlling said servo circuit means so that the screw is axially moved at a predetermined injection speed and then receives a predetermined hold pressure, metering being performed thereafter, and
   follow-up means for following-up said error register,
   said control means effecting a first changeover from the injection speed control to the hold pressure control when the first predetermined time period has elapsed, and a second changeover from the hold pressure control to metering control associated with the metering block after the hold pressure control has been executed for the second predetermined time period,
   said follow-up means forcibly executing said first pulse distribution when said first pulse distribution has not been completed after the first predetermined time period has elapsed, and performing a follow-up operation such that a first error stored in the error register is reduced to a predetermined value, said control means and said second timer means initiating dummy hold pressure control and the detection of passage of the time periods,
   said follow-up means forcibly executing said second pulse distribution when said second pulse distribution has not been completed after at least one of the hold pressure control and said dummy hold pressure control has been executed for the second predetermined time period, and performing a follow-up operation such that a second error stored in the error register is reduced to a predetermined value, such that the first and second changeovers can be performed smoothly to avoid an excessive increase in an injection-molding cycle time and unexpected stoppage of the injection-molding machine.

6. An injection control apparatus for an injection-molding machine according to claim 5, further comprising:
   detecting means for detecting the quantity of pulse distribution to said servomotor,
   wherein said control means performs the hold pressure control when said detecting means detects a completion of pulse distribution up to the injection/hold switching position before said first timer detects that the first predetermined time period has elapsed.

7. An injection control apparatus for an injection-molding machine according to claim 6, wherein said control means is operable to continue the hold pressure control until said second predetermined time period has elapsed even when said detecting means detects the completion of the pulse distribution up to the hold end position before said second timer detects that the second predetermined time period has elapsed.

8. An injection control apparatus for an injection-molding machine according to claims 5, 6 or 7, wherein said pulse distribution means and said follow-up means perform the forced first and second pulse distributions and the follow-up operations at high speeds.

* * * * *

UNITED STATES PATENT AND TRADEMARK OFFICE
CERTIFICATE OF CORRECTION

PATENT NO.   :   4,816,196
DATED        :   March 28, 1989
INVENTOR(S)  :   Hiromasa Otake It is certified that error appears in the above-identified patent and that said Letters Patent is hereby corrected as shown below:

Col. 1, line 19, "starr" should be --start--.

Col. 3, line 26, "accopplish" should be --accomplish--.

Signed and Sealed this

Fourteenth Day of November, 1989

Attest:

JEFFREY M. SAMUELS

Attesting Officer — Acting Commissioner of Patents and Trademarks